June 13, 1950 — O. JACOBSEN — 2,511,337
SHAFT SEAL
Original Filed Oct. 4, 1943
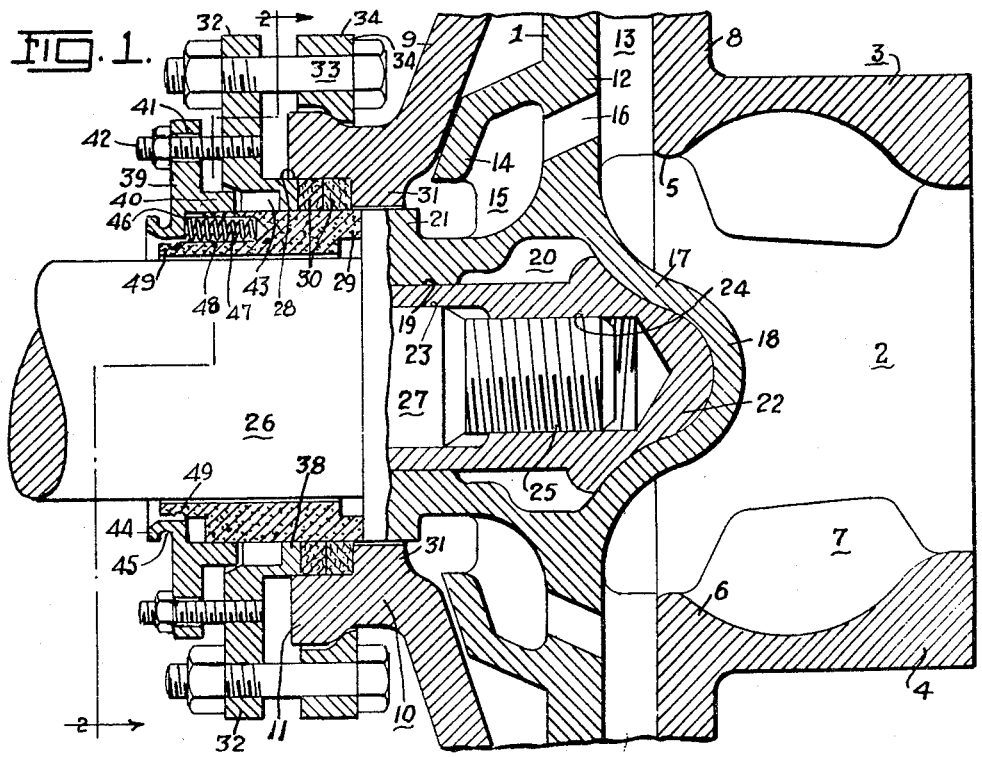
Fig. 1.
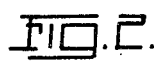
Fig. 2.
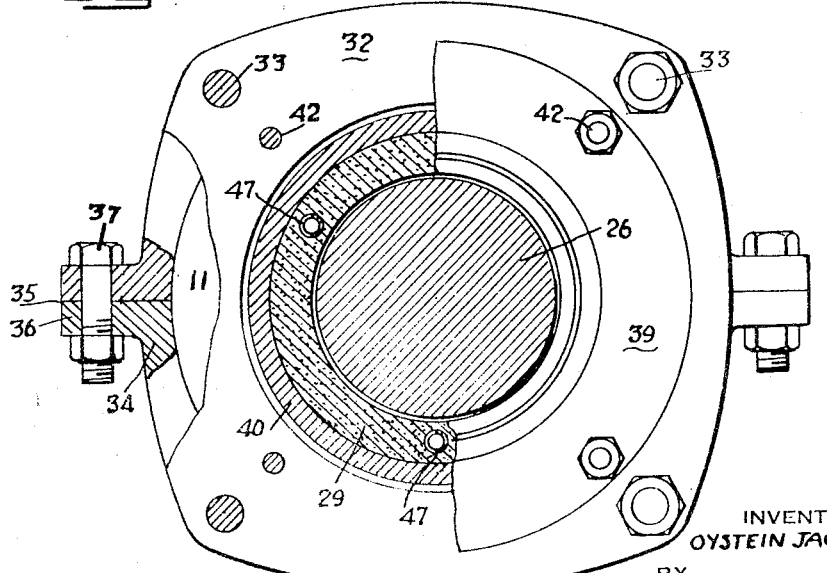
INVENTOR
OYSTEIN JACOBSEN,
BY Toulmin & Toulmin
ATTORNEYS Patented June 13, 1950

2,511,337

UNITED STATES PATENT OFFICE 2,511,337

SHAFT SEAL

Oystein Jacobsen, Montgomery County, Ohio, assignor to The Duriron Company, Inc., Dayton, Ohio, a corporation of New York Original application October 4, 1943, Serial No. 504,826, now Patent No. 2,473,061, dated June 14, 1949. Divided and this application November 24, 1944, Serial No. 564,922

1 Claim. (Cl. 286—11.14)

The present invention relates to centrifugal pumps, and more particularly to seals of those pumps designed to operate at considerable velocities and which are adapted to handle corrosive fluids.

This application is a division of my co-pending application Serial No. 504,826, filed October 4, 1943, now Patent No. 2,473,061, issued June 14, 1949.

When employing a pump for conveying acid-containing solutions, all parts of the pump which come into contact with the corrosive liquid are usually fabricated of non-attackable metal such as silicon iron. Metal of this character is so hard that it is practically unmachinable, so that for the pump shafts it is necessary to use a machinable metal such as high carbon steel and take unusual precaution in preventing the acid from reaching the shaft. In many standard forms of pumps the impeller is mounted on an overhanging journal which is usually constituted of two or more sets of ball bearings and in which the inner ball bearing is positioned not far from the impeller. This consideration makes it all the more necessary that the interior of the casing shall be effectively sealed from the shaft, which extends beyond the casing toward the ball bearings, so that none of the liquid can reach the bearings to impair their effectiveness.

In order to prevent creepage of the corrosive fluid along the pump shaft toward the bearings, it is customary to provide a seal member such as packing rings which exerts a sealing effect in the end thrust and radial directions. A gland is usually provided to take up the wear at the seal, and the arrangement is such under normal conditions that the gland affects both seal surfaces. Consequently should a leak occur past only one of the surfaces, tightening of the gland may apply not only tightening pressure against the leaking surface but also undue pressure against the other surface, which requires no tightening effect, and thus introduces unnecessary friction and wear. It is therefore very desirable in applying seals of this character to centrifugal pumps and particularly those handling corrosive fluids in which the matter of creepage is a very serious item to provide a sealing structure which permits independent adjustment of the end thrust and radial sealing surfaces so that tightening effects are applied only to those surfaces where they are necessary.

Again, in order to improve the character of the end thrust sealing effects it has been proposed to employ a sealing ring integrally secured to the shaft and bring a graphite sealing member into contact with the sealing ring. Sometimes this sealing ring is fabricated separate from the shaft and then later secured thereto in any suitable manner, for example by a sweating operation. While this construction operates quite satisfactorily I have found in accordance with the present invention that the sealing ring can be applied less expensively to the body of the impeller instead of the shaft, in fact, it may be cast integral with the impeller and to that extent reduces the cost of the pump construction as a whole.

Accordingly, the primary object of the invention is to provide an improved seal employing a sealing ring formed integral with the impeller and in which the seal not only effectively serves to prevent the flow of liquid in the end thrust and radial directions, but which also provides for separate adjustment of the thrust and radial sealing effects.

Another object of the invention is to provide a relatively simple but highly effective seal in which the parts may be readily fabricated with a minimum amount of machine work necessary and thereafter readily assembled and adjusted.

The general object of the invention is to provide such a structure as may be applied to high velocity pumps operating on corrosive fluids and in which sealing effects against creepage in the radial and longitudinal directions are positively obtained so that none of the acid-containing solution is permitted to reach the attackable parts of the shaft and bearings.

The invention will be better understood when reference is made to the following description and the accompanying drawings, in which:

Figure 1 represents a fragmentary sectional view taken along the length of the impeller and the casing, and showing the shaft in elevation for clearness.

Figure 2 is a transverse sectional view of the structure shown in Figure 1 as seen along the line 2—2 in the direction of the arrows. Certain parts of the structure has been broken away so that the hidden parts may be seen.

Referring more particularly to Figure 1, reference character 1 generally designates a so-called double shrouded form of pump having an intake 2 and provided with a casing 3 which terminates in a volute chamber (not shown) from which a pressure outlet extends. The intake 2 is contained within a cylindrical body 4 having a large central opening 5 which may take on a bulged or curvilinear configuration in a longitudinal direction as indicated at 6. Flat lugs 7 extending lengthwise of the body 4 may be secured along the opening 5 at the bulged surface, the purpose of these lugs being to prevent swirling and eddy current effects in the liquid which is passing into the pump.

The casing 3 may include a flat front wall 8 and a conical shaped rear wall 9, these walls being positioned at opposite sides of the pump impeller. The wall 9 of the casing terminates in a longitudinally extending cylindrical portion 10 which is provided at the end remote from the casing with an enlarged flange 11. The flange 11 is provided at its inner bore with an annular recess 28, thus forming the shoulder 31.

The impeller may comprise of a vertically positioned web 12 to which is secured on the front side thereof a number of equidistantly positioned vanes or blades 13 arranged in edgewise relation. The web is provided at its rear with an inwardly extending overhanging portion 14, the shape of which is such that it fits the conical surface of the rear casing wall 9 with little or no friction when the impeller is rotated. A number of blades 15 positioned edgewise and arranged equidistantly about the impeller are contained within the recess formed by the overhanging portion 14, the purpose of these blades being to give a suction effect at the rear of the impeller and thus reduce the quantity of liquid that tends to leak to the rear and which might normally find its way to the shaft and the bearings.

Openings 16 are cast by coring in the web 12, these openings communicating between the spaces at the rear and front sides of the impeller. Thus the suction effect produced by the rear blades 15 will cause leakage fluid to pass through the openings 16 and to join the main fluid which is being forced out of the pump by the main blades 13.

The impeller web 12 radiates from a centrally disposed hollow hub member 17 which terminates at the front end preferably in a hemispherical knob 18 by which the incoming fluid is given the proper direction in moving through the pump. The hub 17 is cored to provide a cylindrical opening 19 which leads into a larger opening 20 of such shape that as much metal as possible is removed from the hub without reducing its necessary strength. The hub 17 terminates at the left hand end in an outwardly extending circular flange 21, the rear face of which serves as one of the sealing surfaces. The flange 21 has an external diameter somewhat less than the interior diameter of the cylindrical extension 10 of the casing as will be seen from the drawing.

It will be understood that all of the parts described up to this point are preferably made of a metal which is non-attackable by acid, and in this connection I have found that silicon iron is satisfactory. However, metal of this character is practically unmachinable so that any parts that require a fairly close fit must be made of a different material. For this reason there is contained within the openings 19 and 20 a cylindrical liner 22, the outer periphery of which conforms to the shape and size of the opening 19 and also to the shape of the interior surface of the knob 18 on the hub 17. This liner is bored out to form two cylindrical openings 23 and 24 of different sizes, the bore 24 being threaded to receive the threaded end 25 of a driving shaft 26. The shaft is provided with a reduced diameter portion 27 which fits snugly in the opening 23 of the liner. The latter is made fast to the hub 17 in any suitable manner so that when the threaded portion of the liner receives the end of the shaft 26, the impeller is firmly secured to the shaft. The latter is journaled on one or more sets of bearings, usually of the frictionless or ball bearing type, and positioned remote from the impeller so as to permit the impeller end of the shaft to overhang the bearings.

It has been explained hereinbefore that it is highly desirable and in the case of pumping acid-containing liquids absolutely necessary that none of the liquid be permitted to creep along the shaft and to enter the bearings. It will be understood that the shaft and the associated bearings are usually made of machinable metal which is greatly susceptible to attack by acid.

In accordance with the present invention an improved form of seal is provided which not only prevents longitudinal leakage but also radial leakage, and the arrangement is such that independent adjustments can be made at either of the leakage surfaces.

Immediately adjacent the left-hand or outermost surface of the flange 21 there is provided a sealing ring 29 of a self-lubricating material such as graphite formed as an elongated cylinder. Snugly fitting within the annular recess 28 and surrounding the outer periphery of the sealing ring 29 there is inserted one of several (two as shown) packing rings 30. These rings bear against the shoulder 31 and are for the purpose of preventing even the slightest amount of creepage of acid-containing fluid along the surface against which the packing rings bear. While these rings may be made of any suitable material, I have found that synthetic rubber serves this purpose satisfactorily, such as Thiokol, Perbunan or neoprene. Inasmuch as the sealing ring is prevented from rotating even in the slightest degree, as will be explained hereinafter, there is little or no wear between the packing rings 30 and the sealing ring 29.

In order to apply pressure against the packing rings 30, a cylindrical gland 32 is employed which is provided with four or more equidistantly spaced openings for receiving bolts 33 by which the gland is secured to a split ring 34. The ring 34 is split at the joint 35 (Figure 2) and is provided with lugs 36 at the two diametric positions to accommodate a pair of clamp bolts 37. The ring 34 has an interior dimension and configuration such that when the two parts of the ring are bolted together at 37, the ring will secure itself to the enlarged portion 11 of the cylindrical extension 10. The gland 32 is provided at its inner periphery with an upturned projection 38 which has a width as measured in the radial direction sufficiently small to be received by the recess 28 and thus adapted to bear against the packing rings 30. It is therefore apparent that when the bolts 33 are tightened pressure can be exerted against the packing rings and cause them to press against the surface with which they come into contact.

In order to regulate or control the pressure exercised by the sealing ring 29 against the flange 21, a ring 39 may be employed, this ring having a flange portion 40 which loosely surrounds the ring 29. The ring 39 is provided with three or more (four as shown) equidistantly spaced openings 41 for loosely receiving bolts 42 which are adapted to be threadedly secured within the gland member 32. Thus by tightening the bolts 42 it is possible to move the ring 39 to the right. If desired, the gland member 32 may be provided with an annular recess 43 which can loosely accommodate the flange portion 40 of the ring 39 when the bolts 42 are tightened.

The ring 39 at the left-hand end is provided with a circular bead 44 separated from the main portion of the ring by a groove 45 for preventing acid or other fluid from traveling along the surface of the ring. Directly opposite from the bead 44, the ring 39 is provided with a cupped back portion 46 which bears against a number of compression springs 47 contained within countersunk openings 48. These openings may extend lengthwise of the sealing ring 29 at the end adjacent the ring 39. If desired, the ring 29 may also be provided with a circular bead 49 together with a groove similar to the elements 44 and 45 of the ring 39.

Assuming that all of the various parts as described have been assembled in the positions shown in Figure 1 and the bolts have been tightened, it is apparent that any tightening of the bolts 42 will cause the springs 47 to compress and tend to force the sealing ring 29 to move to the right against the flange 21 of the casing. Tightening of the bolts 33 will urge the gland member 32 to the right against the packing rings 30. Since these packing rings are of an elastic character, they will fill out the space between the annular recess 28 and will completely block the passage of any fluid along the surfaces with which they come into contact. Thus, the bolts 42 and 33 represent means for independently adjusting the sealing elements against radial leakage and longitudinal creepage, respectively.

In impellers of this character there is the tendency for fluid to leak past the conical shaped surface of the overhanging portion 14, and as explained hereinbefore much of this leakage fluid is impelled to the opening 16 by the suction effect of the blades 15. However, should even the smallest amounts of fluid start to creep lengthwise along the outer surface of the flange 21, the creepage fluid is immediately blocked from traveling radially toward the shaft 26 by the relatively tight fit between the sealing ring 29 and the adjacent metal surface.

Should any of the creepage fluid tend to move lengthwise over the outer surface of the sealing ring 29, the passage of this fluid is completely blocked by the packing rings 30. The purpose of the springs 47 is to provide a continuous but resilient urge of the sealing ring 29 toward the casing while the bolts 42 provide positive stops to any undue movement of the ring 39 in the left-hand direction. It is apparent that the combined effect of the bolts 42 and the springs 47 is to maintain a steady and even force urging the sealing ring 29 to the right and yet introduce into this force a flexible component resulting from the presence of the springs.

It will be noted that there is complete independence between the adjustment of the sealing ring and the flange 21 and also between the packing rings 30 and the downwardly projecting portion 31 formed on the rear wall of the pump casing.

The adjustment at the sealing ring 29 can be effected without altering in the slightest the adjustment at the packing rings 30, and the adjustment at the packing rings can be effected without altering in the slightest the adjustment at the sealing ring provided that when the bolts 33 are tightened to apply pressure to the packing rings the bolts 42 are loosened slightly to prevent such pressure from also being communicated to the sealing ring.

Due to this nicety of adjustment with respect to the seal structure, even the slightest amount of fluid is prevented from reaching the shaft 26 through any of the radial or longitudinal passageways and wear of the various sealing surfaces may be readily accommodated by suitable adjustment, and this adjustment may be applied to the specific sealing surface or area that needs adjustment without interference with the adjustment on the other sealing surface or area.

It will be noted that the sealing ring 29 is held completely against rotation due to the traction exerted by the springs 47 against the stationary ring 39.

It is evident that the seal structure as described consists of simple parts and also may be readily assembled and dis-assembled for installation, inspection, or replacement purposes, necessitating only the fewest tools and the smallest number of operations. Yet a structure formed in the manner shown and described is very effective in preventing even the slightest leakage of fluid from a high pressure pump back along the shaft or into any other position where fluid of an acid-containing character may attack machinable metal parts.

While I have described my invention as pertaining to that form of impeller on which the sealing flange 21 is integrally connected as by a casting operation, if desired, the flange member may be formed separately and secured in any other manner to the impeller. Moreover, the flange member 21 may also be formed on the shaft 26, although in general I prefer, mainly for less cost reasons, to cast the flange 21 directly on to the impeller hub.

While the apparatus herein disclosed and described constitutes a preferred form of the invention, yet it is to be understood that the apparatus is capable of mechanical alteration without departing from the spirit of the invention and that all such modifications as follow within the scope of the appended claim are intended to be included herein.

I claim:

A seal for a high pressure fluid pump including a shaft, a casing for the pump, said casing having a hollow extension surrounding the shaft and provided with an interior recess, a packing ring in said recess, the interior diameter of said extension being greater than the shaft to leave an annular space therebetween, a sealing ring within said space and located between said packing ring and the shaft, a gland for applying pressure to said packing ring in order to prevent leakage of fluid in the longitudinal direction, said gland being spaced from the casing but adjustably secured thereto by an adjustment screw in order to apply variable amounts of pressure to the packing ring, and means including a plate member and a separate adjustment screw threaded into said gland for applying variable pressure to said sealing ring in order to prevent leakage of fluid in the radial direction, whereby when the packing ring screw is adjusted, pressure is simultaneously applied to the sealing ring screw but the last mentioned screw can be adjusted independently of the packing ring screw.

OYSTEIN JACOBSEN.

REFERENCES CITED

The following references are of record in the file of this patent:

UNITED STATES PATENTS

| Number | Name | Date |
| --- | --- | --- |
| 660,399 | Shepard | Oct. 23, 1900 |
| 1,849,912 | Daddysman | Mar. 15, 1932 |
| 1,900,523 | Schmierer | Mar. 7, 1933 |
| 1,902,960 | La Bour | Mar. 28, 1933 |
| 2,157,597 | Dupree | May 9, 1939 |
| 2,247,505 | Kohler | July 1, 1941 |

FOREIGN PATENTS

| Number | Country | Date |
| --- | --- | --- |
| 24,955 | Great Britain | of 1906 |